(12) United States Patent  
Hoshi et al.

(10) Patent No.: US 8,243,349 B2
(45) Date of Patent: Aug. 14, 2012

(54) IMAGE READING METHOD AND IMAGE READING APPARATUS

(75) Inventors: Akimitsu Hoshi, Kawasaki (JP); Atsushi Miyahara, Higashikurume (JP)

(73) Assignee: Canon Kabushiki Kaisha, Tokyo (JP)

( * ) Notice: Subject to any disclaimer, the term of this patent is extended or adjusted under 35 U.S.C. 154(b) by 519 days.

(21) Appl. No.: 12/511,304

(22) Filed: Jul. 29, 2009

(65) Prior Publication Data

US 2010/0033773 A1 Feb. 11, 2010

(30) Foreign Application Priority Data

Aug. 5, 2008 (JP) ................................. 2008-201963
Aug. 5, 2008 (JP) ................................. 2008-201964

(51) Int. Cl.
*H04N 1/04* (2006.01)

(52) U.S. Cl. ......... 358/475; 358/509; 358/474; 358/494

(58) Field of Classification Search ................... 358/509, 358/475, 474, 486, 497, 496, 494
See application file for complete search history.

(56) References Cited

U.S. PATENT DOCUMENTS

| | | | | |
|---|---|---|---|---|
| 4,534,642 | A * | 8/1985 | Miura et al. | 399/138 |
| 7,101,096 | B2 * | 9/2006 | Sasai et al. | 400/48 |
| 7,103,206 | B2 * | 9/2006 | Graves et al. | 382/135 |
| 7,219,362 | B2 * | 5/2007 | Beckwith et al. | 720/736 |
| 7,680,007 | B2 * | 3/2010 | Ishii | 369/53.27 |
| 7,978,381 | B2 * | 7/2011 | Sheng et al. | 358/498 |
| 8,040,565 | B2 * | 10/2011 | Shibaki et al. | 358/2.1 |
| 2001/0035603 | A1 * | 11/2001 | Graves et al. | 271/265.01 |
| 2005/0088707 | A1 | 4/2005 | Sakurai | |
| 2006/0152777 | A1 | 7/2006 | Iwasaki | |
| 2008/0247001 | A1 | 10/2008 | Maki et al. | |

FOREIGN PATENT DOCUMENTS

| | | | |
|---|---|---|---|
| JP | 03031839 | A | 2/1991 |
| JP | 05142672 | A | 6/1993 |
| JP | 06164835 | A | 6/1994 |
| JP | 07087269 | A | 3/1995 |
| JP | 10261072 | A | 9/1998 |
| JP | 2001223850 | A | 8/2001 |
| JP | 2002027173 | A | 1/2002 |
| JP | 2005-156600 | A | 6/2005 |
| JP | 2006091979 | A | 4/2006 |
| JP | 2007102641 | A | 4/2007 |
| JP | 2007-158379 | A | 6/2007 |

* cited by examiner

*Primary Examiner* — Negussie Worku

(74) *Attorney, Agent, or Firm* — Canon USA Inc. IP Division

(57) ABSTRACT

There is provided a method of reading an image by reading reflected light from a document that is illuminated. The method includes illuminating the document with light from a light source, changing a degree of diffusion of the light applied from the light source to the document, and reading reflected light from the document. The degree of diffusion is changed in accordance with a type of the document.

6 Claims, 7 Drawing Sheets

LIGHT-DIFFUSING MEMBER

IMAGE READING METHOD AND IMAGE READING APPARATUS

BACKGROUND OF THE INVENTION

1. Field of the Invention

The present invention relates to a method and apparatus for reading image information on a medium, and an image reading and recording apparatus including the image reading apparatus.

2. Description of the Related Art

Image scanners, copiers, facsimiles, multifunction printers, and the like include image reading apparatuses. In such an image reading apparatus, a reading medium, such as a paper document, is illuminated, and the illuminated surface is optically read with a line sensor. To illuminate the reading medium, a light source capable of providing line illumination, such as a cold cathode fluorescent tube or a xenon tube, is commonly used. In place of such a light source, a growing number of recent apparatuses employ other light sources in each of which a plurality of white-light-emitting diodes (white LEDs), serving as point light sources, are arrayed. Direct use of such an illumination unit including a plurality of point light sources often produces nonuniformity in illuminance. To solve this problem, Japanese Patent Laid-Open No. 2005-156600 and No. 2007-158379, for example, disclose techniques for reducing nonuniformity in illuminance by diffusing light from point light sources through light-diffusing members.

In these techniques, however, if the medium to be read is not a paper document but a surface containing a reflective diffraction surface, for example, the label side (the side where the title of content and so forth are printed) of a disc medium such as a compact disc (CD), the reflective diffraction surface causes diffraction, and interference due to the diffraction may cause nonuniformity (nonuniformity in color and brightness) in the read image.

SUMMARY OF THE INVENTION

The present invention provides a technique for reducing nonuniformity in color and brightness occurring when a target surface of a reading medium (hereinafter referred to as a "medium") containing a reflective diffraction surface is optically read.

According to an aspect of the present invention, there is provided a method of reading an image by reading reflected light from a document that is illuminated. The method includes illuminating the document with light from a light source, changing a degree of diffusion of the light applied from the light source to the document, and reading reflected light from the document. The degree of diffusion is changed in accordance with a type of the document.

Further features of the present invention will become apparent from the following description of exemplary embodiments with reference to the attached drawings.

DESCRIPTION OF THE EMBODIMENTS

Figure 7A:
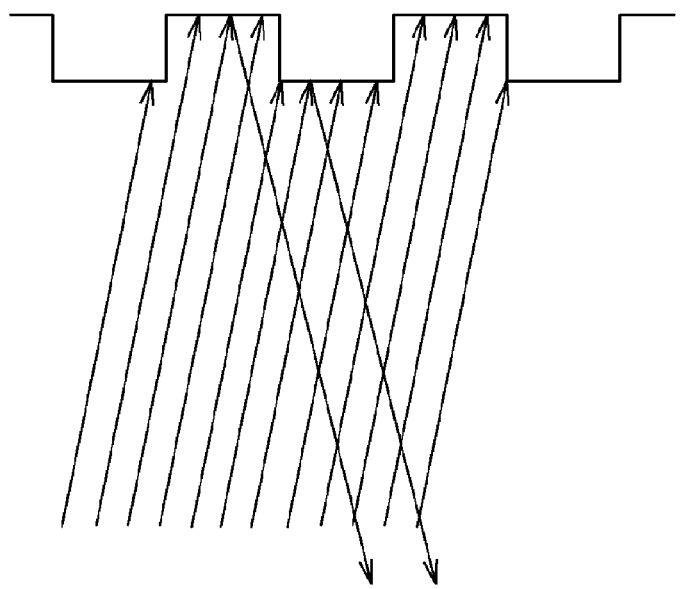
FIG. 7A shows the mechanism of occurrence of nonuniformity on a reflective diffraction surface.

FIG. 7A shows illuminating light and reflected light produced when a reflective diffraction surface is read. Label sides of some disc media are finely textured, as are data-recording sides thereof. The data-recording side of a CD is, for example, an aluminum reflecting surface having a series of data pits, i.e., hollows and heights, forming a spiral track at a pitch of about 1.6 µm in a disc-radius direction. Data on the reflecting surface is read through a transparent substrate of the CD. The label side, opposite the reflecting surface, is constructed by forming a transparent protective layer on the aluminum reflecting surface and printing a label on the protective layer. The spiral track can also be observed from the label side, in portions not having printing ink, through the transparent protective layer. The depth of the data pits corresponds to a quarter of the wavelength of infrared laser light, with which data is read. The data pits having the depth corresponding to the foregoing wavelength-order of light act as a diffraction grating. Such diffraction, the angle of which varies depending on the wavelength of light (the color), causes a phenomenon called color separation. Color separation occurs not only for infrared laser light but also for visible light.

Reflective diffracted light from the hollows and reflected light from the heights optically interfere with each other. Since the angle of diffracted light varies depending on the color, an observer sees nonuniformity in color, i.e., differences in color with positions. Depending on the type of the light source, such nonuniformity in color may be observed as a pattern of reflective diffraction, i.e., nonuniformity in brightness.

Figure 7B:
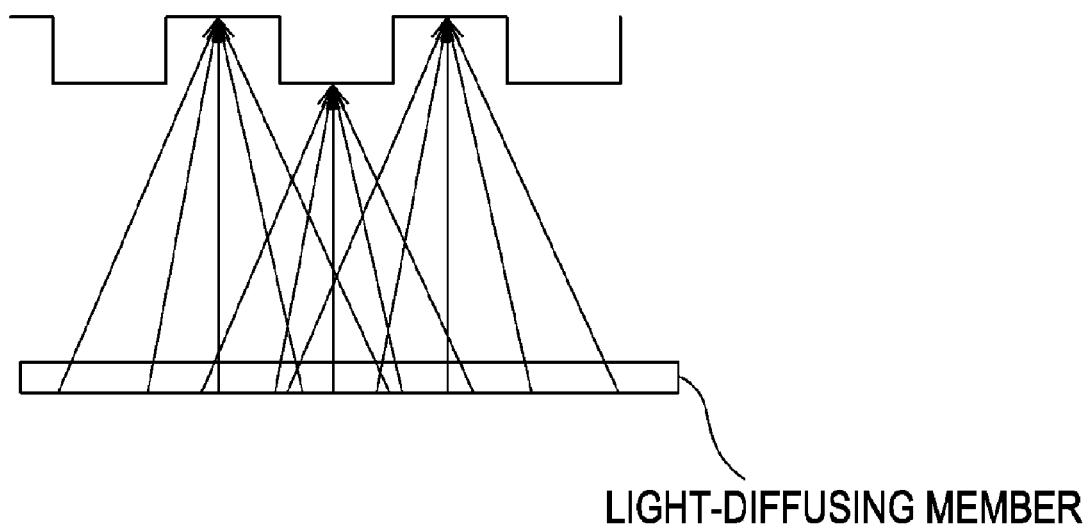
FIG. 7B shows a concept of the embodiment of the present invention.

To reduce such nonuniformity, referring to FIG. 7B, the reflective diffraction surface is illuminated through a light-diffusing member (a member that allows light to be transmitted and diffused therethrough). The light-diffusing member emits light components in various directions. Accordingly, light is applied to the hollows and heights, forming the reflective diffraction surface, in various directions. In such a case, even if a light component incident on the reflective diffraction surface in one direction is diffracted and produces a variation in light intensity, like variations in light intensity produced by light components in other directions are superimposed, and the variations are averaged to be substantially uniform. As a result, nonuniformity in color and brightness is significantly reduced. Thus, with illumination produced by light diffused through a light-diffusing member, color separation is prevented on the whole, and nonuniformity in the read image can be reduced significantly.

The larger the interval between the target surface and the light-diffusing member (the light-diffusing surface), the larger the effect of reducing nonuniformity. However, if the interval is too large, the read image of the target surface blurs noticeably. Therefore, it is desirable to define an upper limit. Practically, the interval can be defined within the range from 0.1 mm to 3 mm, or more strictly, 0.5 mm to 1.5 mm.

To enhance the effect of reducing nonuniformity, the degree of diffusion caused by the light-diffusing member is desired to be high. However, a high diffusivity produces an illumination loss of, for example, about 30 to 40%. Hence, the light-diffusing member is used only when a target surface containing a reflective diffraction surface is to be illuminated. In any other case where a plain document is read, the target surface is to be illuminated with brighter light, without using the light-diffusing member. That is, image reading is to be performed by an appropriate method depending on whether or not the target surface of a medium contains a reflective diffraction surface.

First Exemplary Embodiment

Embodiments of the present invention will now be described in detail, in which the present invention is applied to an image reading and recording apparatus including an inkjet printing device, i.e., what is called a multifunction printer.

Figure 1A:
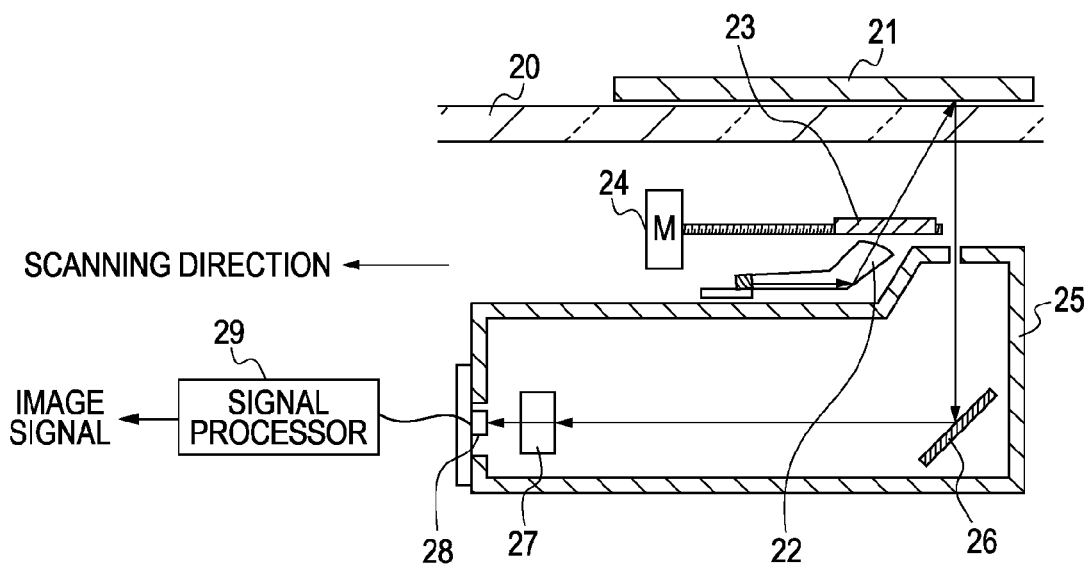
FIGS. 1A and 1B are cross-sectional views of a scanner device provided in the body of a multifunction printer according to an embodiment of the present invention.
Figure 1B:
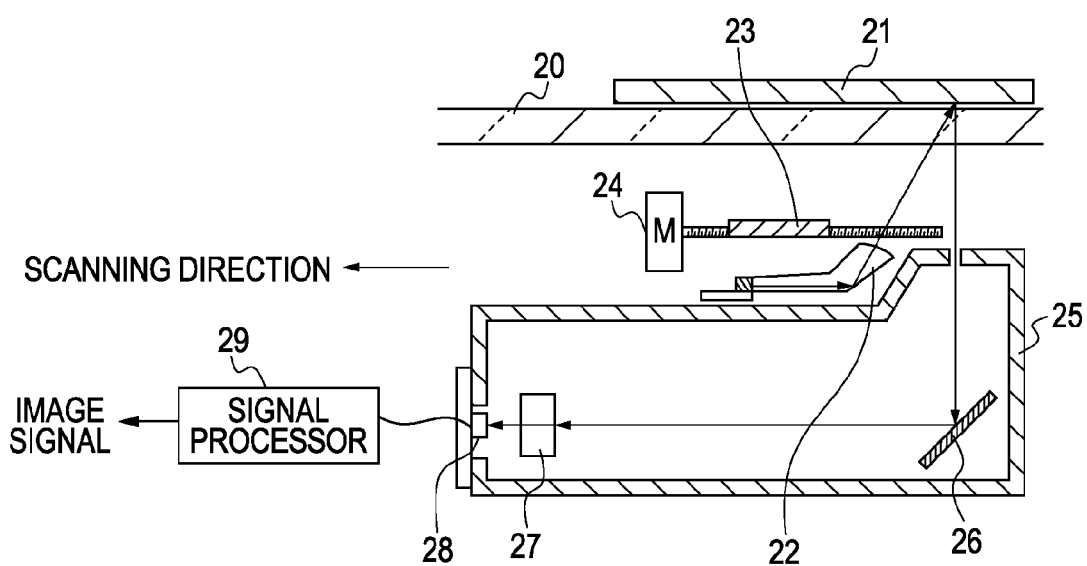

FIGS. 1A and 1B are cross-sectional views of a scanner device provided in a printer body. The scanner device basically includes an illumination unit 22, a reading unit 25, a signal processor 29, and a glass table 20.

The illumination unit 22 emits linear illuminating light and includes an emission source and a guide body. Examples of the emission source include a white-LED array, a white-organic-light-emitting-diode (white-OLED) array, a cold cathode fluorescent tube, a xenon tube, and the like. A document 21 is placed on the glass table 20, with a target surface face down, and the target surface is illuminated with light from the illumination unit 22 linearly in a depth direction in FIGS. 1A and 1B. Examples of the document 21 include a disc medium, a plain paper, and the like, as described below.

A mechanism configured to change the diffusivity of the illuminating light is provided in an optical path, between the emission source of the illumination unit 22 and the glass table 20. The mechanism includes a light-diffusing plate 23 that allows light to be transmitted therethrough, and a motor drive 24 that moves the light-diffusing plate 23 in a scanning direction. Details of the mechanism will be described separately below.

The reading unit 25 optically reads the target surface that is illuminated. Light reflected by the target surface of the document 21 is further reflected by a reflecting mirror 26, is transmitted through an imaging lens 27, and is incident on a line sensor 28. The line sensor 28 is a one-dimensional array of photoelectric conversion elements, i.e., a number of photodetectors arrayed in the depth direction in FIGS. 1A and 1B. A linear illumination region on the target surface of the document 21 is imaged on the photodetectors included in the line sensor 28.

The signal processor 29 includes an analog front end and an image processor. The signal processor 29 receives an output from the line sensor 28, generates an image signal from the output, and outputs the image signal to an external device.

Reading is performed while the illumination unit 22 and the reading unit 25 together move in the scanning direction, represented by the arrow in FIGS. 1A and 1B, relative to the glass table 20. Thus, a two-dimensional image signal is obtained. In the printer of the first exemplary embodiment, the glass table 20 is stationary, whereas the illumination unit 22 and the reading unit 25 are movable. Alternatively, the glass table 20 may be the movable one.

Figure 2A:
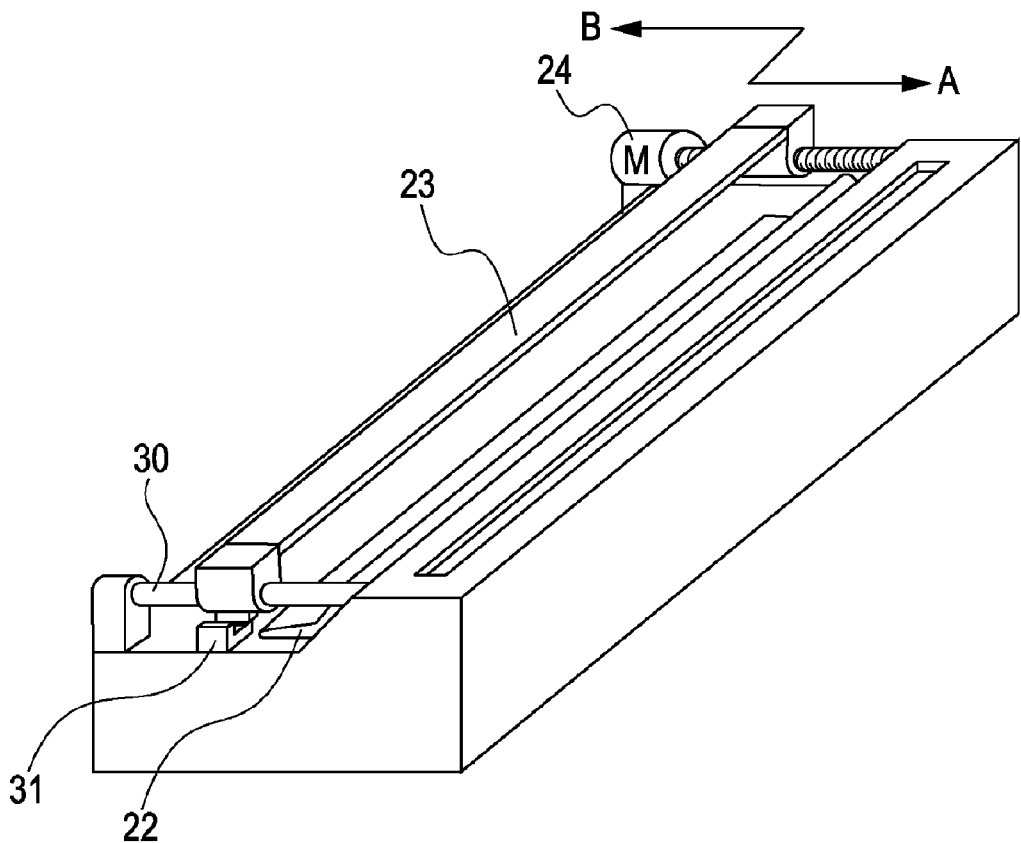
FIG. 2A is a perspective view of a mechanism configured to change the diffusivity of illuminating light.

FIG. 2A is a perspective view showing details of the mechanism including the light-diffusing plate 23 as a major component and configured to change the diffusivity of the illuminating light.

The light-diffusing plate 23 has at least one of a top surface and a bottom surface (the surface on which the illuminating light is incident) thereof function as a light-diffusing surface. The light-diffusing surface is processed so as to form a random diffusing surface by, for example, graining, surface roughing, matte coating, application of light-diffusing resin, or the like. Alternatively, the light-diffusing surface may be a fine prism-sheet surface, or the entirety of the light-diffusing plate 23 may be provided as a light-scattering body obtained by mixing a light-diffusing substance (such as fine, translucent light-scattering particles) into a transparent material that is to form the light-diffusing plate 23. In the latter alternative case, light scatters inside the light-diffusing plate 23, and therefore the aforementioned light-diffusing process is not necessarily performed on the bottom and top surfaces of the light-diffusing plate 23.

The light-diffusing plate 23 is linearly movable in the A-B direction shown in FIG. 2A by being driven by the motor drive 24 and being guided by a guide shaft 30. The position of the light-diffusing plate 23 is switchable between both ends, at A and B, of the movable range. When the light-diffusing plate 23 resides at the end A as in FIG. 1A, the illuminating light, having a slit shape, emitted from the illumination unit 22 passes through the light-diffusing plate 23. When the light-diffusing plate 23 resides at the end B as in FIG. 1B, the illuminating light does not pass through the light-diffusing plate 23. Instead of moving the light-diffusing plate 23 linearly, the light-diffusing plate 23 may be rotated so as to be switchable between a position where the illuminating light pass therethrough and a position where the illuminating light does not pass therethrough. A position sensor 31 detects at which of the positions shown in FIGS. 1A and 1B the light-diffusing plate 23 resides.

Figure 2B:
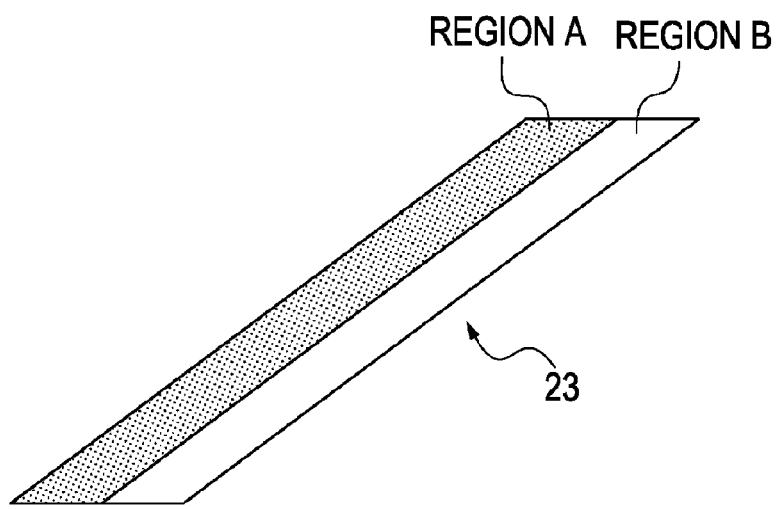
FIG. 2B shows a variation of a light-diffusing plate.

In the first exemplary embodiment, illumination is switched between a state where the light-diffusing plate 23 is used and a state where the light-diffusing plate 23 is not used. A variation is shown in FIG. 2B, in which the light-diffusing plate 23 includes a plurality of regions (two regions A and B in this case) having different diffusivities, and the regions through which illumination is provided are switched between. In this case, the region A has a higher diffusivity than the region B.

A case where the multifunction printer of the first exemplary embodiment is used as a scanner will now be described.

Figure 3:
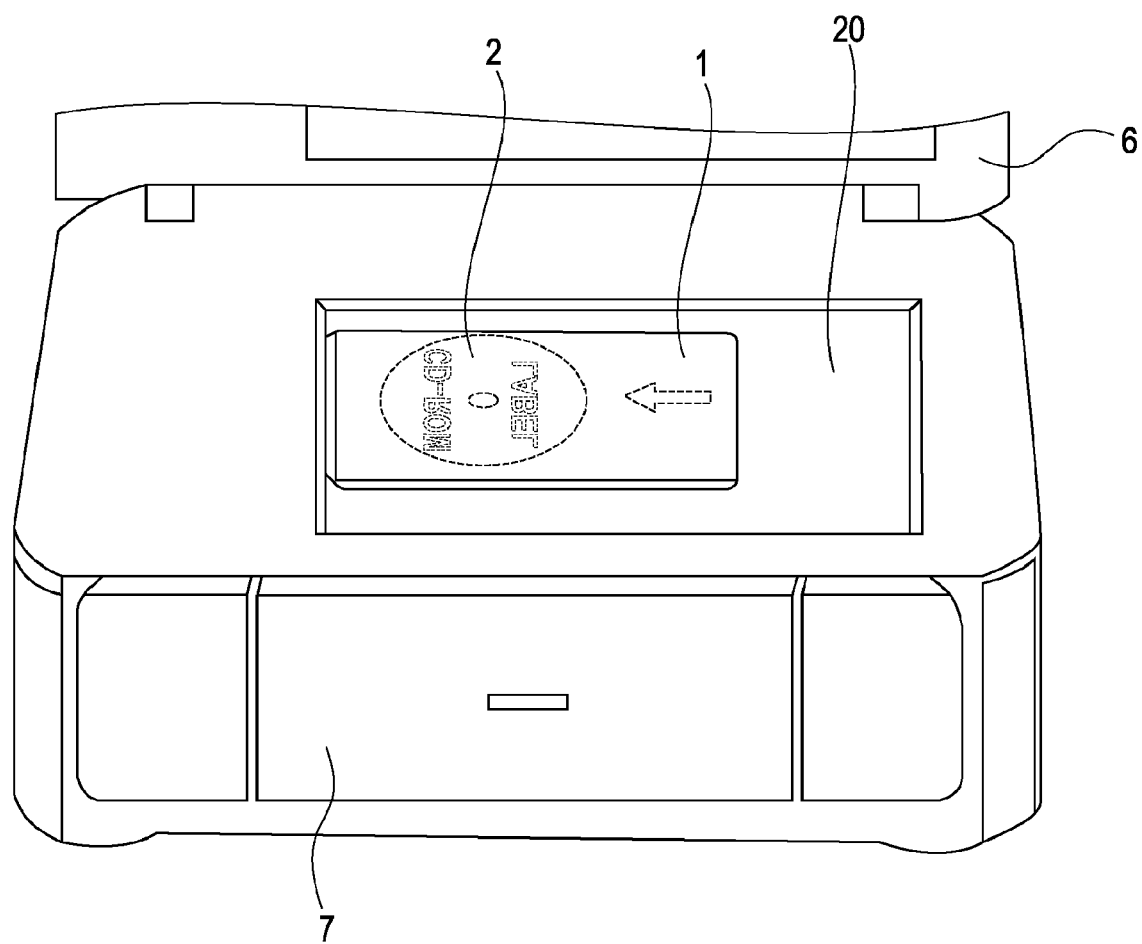
FIG. 3 shows a state where a tray is placed on a scanner device when the label side of a disc medium is to be read.

To read a plain document, such as paper, a user directly places the document on the glass table 20. To read the label side of a disc medium 2, referring to FIG. 3, the user sets the disc medium 2 onto a disc-medium tray 1 and places the tray 1 having the disc medium 2 onto the glass table 20, with the label side face down. Further, the user closes an upper lid 6 of the apparatus, i.e., the scanner, so that unwanted external light is excluded during reading.

When the user presses a scan start button in this state, the apparatus positions the light-diffusing plate 23 as shown in FIG. 1B and performs reading. During this operation, the apparatus automatically checks whether or not the document placed on the glass table 20 is a disc medium having a reflective diffraction characteristic.

This check is performed as follows. In accordance with the image read as described above, the signal processor 29 performs image recognition of an identification mark provided on the tray 1 or the shapes of the tray 1 and the disc medium 2 (a rectangle and a circle therewithin with predetermined dimensions). If the document is recognized as the tray 1, it is determined that the medium to be read is a disc medium. Image recognition may alternatively be performed by directly recognizing the shape of the disc medium 2 (for example, a circle having a diameter of 12 cm or 8 cm and a hole in the center thereof), without using the tray 1. In the alternative case, the disc medium 2 is directly placed on the glass table 20, without using the tray 1.

If it is determined that the document on the glass table 20 is not a disc medium, the signal processor 29 directly outputs the read image as an image signal.

If it is determined that the document is a disc medium, the apparatus operates such that the light-diffusing plate 23 is moved to the position shown in FIG. 1A by the motor drive 24, and then second reading is performed. In the second reading, the light-diffusing plate 23 increases the diffusivity of the illuminating light compared with the usual case where the light-diffusing plate 23 is positioned as shown in FIG. 1B. Therefore, even if a reflective diffraction surface is to be read, an image free from nonuniformity can be obtained. In such a case, the quantity of illuminating light is reduced by a quantity corresponding to the quantity of light diffused by the light-diffusing plate 23. Therefore, the scanning speed is reduced by the corresponding amount compared with the usual case so that the quantity of exposure light (the quantity of light received multiplied by the exposure time) received by the line sensor 28 becomes sufficient for reading. The image obtained in the second reading is output as an image signal by the signal processor 29.

Thus, only when a disc medium is to be read, the diffusivity of the illuminating light is increased, whereby occurrence of nonuniformity is suppressed. When any other document is to be read, high-speed reading under illumination with no reduction in light quantity is performed. That is, image reading can be performed by an appropriate method depending on whether or not the target surface of a medium contains a reflective diffraction surface.

Second Exemplary Embodiment

Figure 4A:
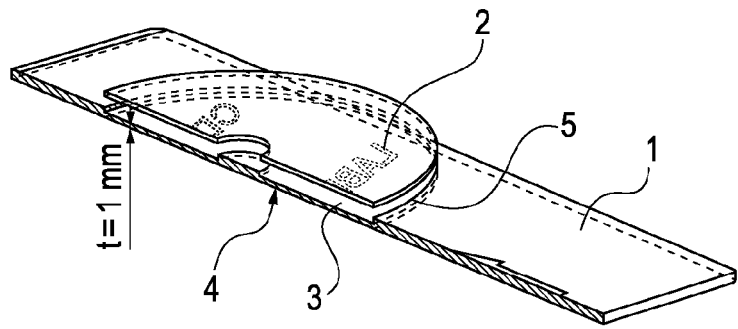
FIG. 4A is a perspective view showing a cross section of the tray having a disc medium thereon.

FIG. 4A is a perspective view showing a cross section of a tray and a disc medium held thereon. A disc medium 2, which is to be read, is a data-recording medium, for example, an optical disc such as a CD, a digital versatile disc (DVD), or a Blu-ray disc (BD), a magneto-optical disc, or a magnetic disk. In the second exemplary embodiment, the disc medium 2 is an optical disc having a diameter of 12 cm. In general, a disc medium has a data-recording surface on one side and a label on the other side. The label sides of many disc media form reflective diffraction surfaces that are finely textured, as are the data-recording surfaces, and on which content titles and the like are printed.

A tray 1 has a stepped portion 5 provided in a circular shape along the shape of the disc medium 2 having a diameter of 12 cm. The disc medium 2 is positioned by being enclosed by the stepped portion 5. The tray 1 also has a holding portion 3 including a disc-holding surface, below the stepped portion 5. The holding portion 3 holds one side of the disc medium 2. The disc medium 2 set on the tray 1 is positioned relative to the tray 1 by the disc-holding surface of the holding portion 3 and the stepped portion 5.

The holding portion 3, having a thickness t, is made of a transparent material that allows light to be transmitted therethrough. The thickness t is a value determined within the above-mentioned numerical range, specifically, 1 mm in the second exemplary embodiment.

The bottom surface (the surface opposite the disc-holding surface) of the holding portion 3 functions as a light-diffusing surface 4. The light-diffusing surface 4 is processed so as to form a random diffusing surface by, for example, graining, surface roughing, matte coating, application of light-diffusing resin, or the like. Alternatively, the light-diffusing surface 4 may be a fine prism-sheet surface.

The light-diffusing surface 4 may be provided not only on the bottom surface of the holding portion 3 but also on the top surface (the disc-holding surface) of the holding portion 3. Alternatively, the entirety of the holding portion 3 may be provided as a light-scattering body obtained by mixing a light-diffusing substance (such as fine, translucent light-scattering particles) into a transparent material that is to form the holding portion 3. In such a case, light scatters inside the holding portion 3, and therefore the aforementioned light-diffusing process is not necessarily performed on the bottom and top surfaces of the holding portion 3.

Figure 4B:
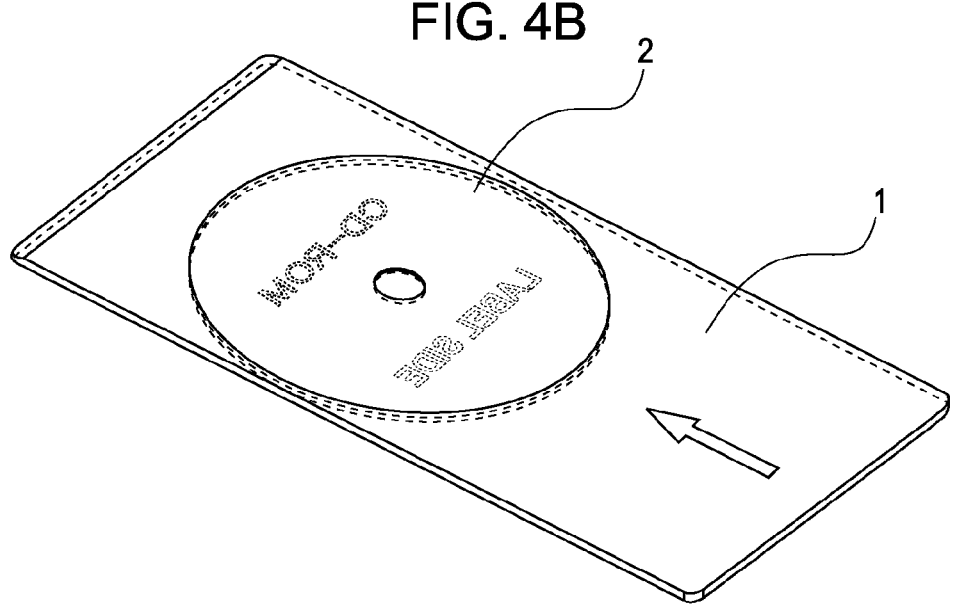
FIG. 4B shows an orientation of a disc medium that is set on the tray when the label side of the disc medium is to be read.

A case where the multifunction printer is used as a scanner will now be described. To read the label side of the disc medium 2, referring to FIG. 4B, a user sets the disc medium 2 onto the tray 1, with the label side face down (so that the label side comes into contact with the disc-holding surface of the holding portion 3). In this state, referring now to FIG. 3, the tray 1 having the disc medium 2 is placed onto the glass table 20 of the printer body, and then reading is performed. The upper lid 6 is to be closed so that unwanted external light is excluded during reading.

To read a plain document, such as paper not having a reflective diffraction surface, the document is directly placed on the glass table 20, without the tray 1. That is, only when the label side of a disc medium is to be read, the illuminating light is diffused, whereby reading with reduced nonuniformity is performed. When any other document is to be read, reading under illumination with no reduction in light quantity is performed, without the tray 1. Thus, image reading can be performed by an appropriate method depending on whether or not the target surface of a medium contains a reflective diffraction surface.

Figure 4C:
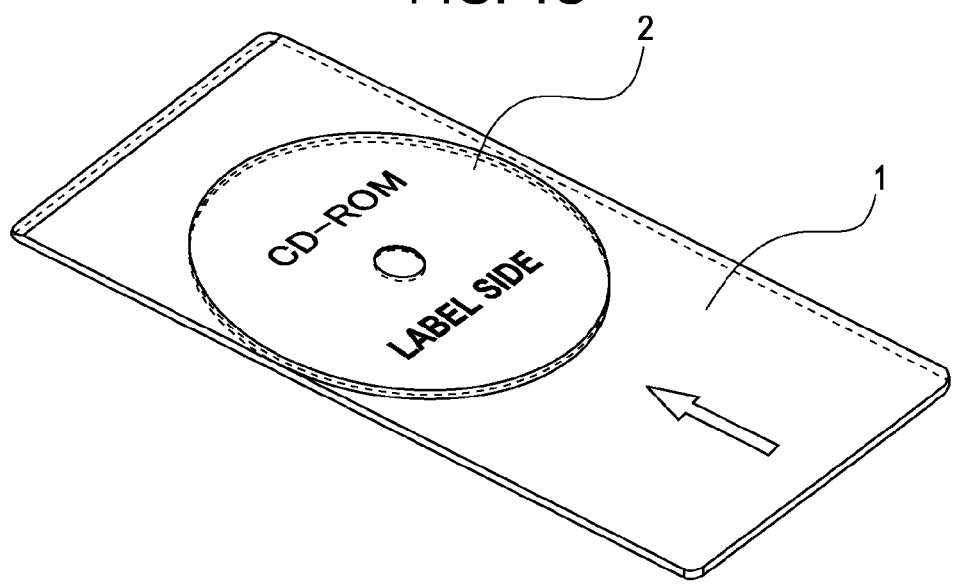
FIG. 4C shows an orientation of a disc medium that is set on the tray when printing is to be performed on the label side of the disc medium.
Figure 5:
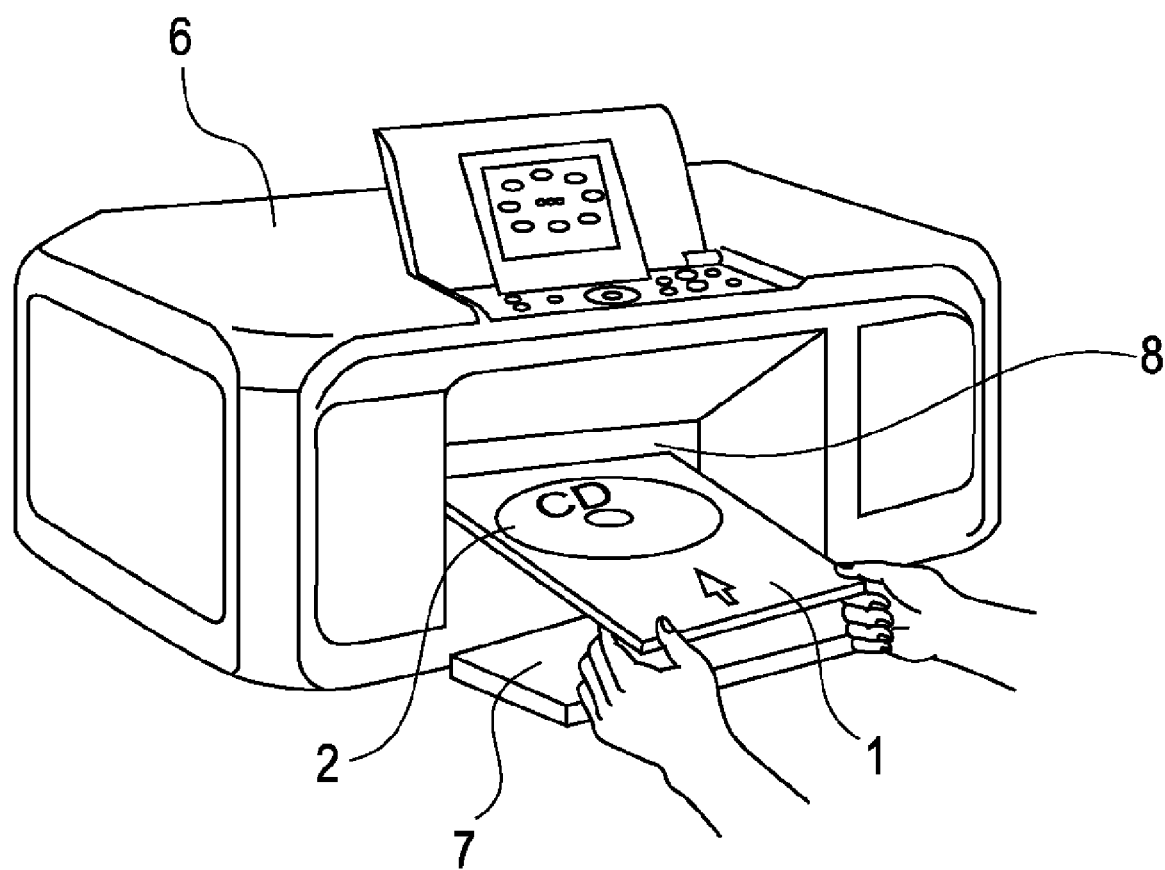
FIG. 5 shows the way in which the tray is set into the printer when printing is to be performed on the label side of a disc medium.

When the multifunction printer is used as a printer, characters and images can be printed on the label side of the disc medium 2. In such a case, referring to FIG. 4C, a user sets the disc medium 2 onto the tray 1, with the label side face up (so that the data-recording surface comes into contact with the disc-holding surface of the holding portion 3). In this state, referring now to FIG. 5, a front lid 7 of the printer body is opened, and the tray 1 having the disc medium 2 is inserted into a conveyance mechanism 8. While the tray 1 is conveyed by the conveyance mechanism 8, printing is performed on the label side by a printing device included in the apparatus, i.e., the printer. The printing device performs printing by ejecting ink, by an inkjet method in which heater elements or piezoelectric elements are utilized. The printing device also has a function of copying the image of a label, in which an image on the label side of a disc medium 2 is first read by the scanner device and is printed on the label side of another disc medium 2.

Thus, in the multifunction printer of the second exemplary embodiment, a single tray is shared between different uses: for scanning and for printing. When the tray is not used, the tray can be stored at the bottom of the printer body, whereby usability is improved.

Variation 1

Figure 6:
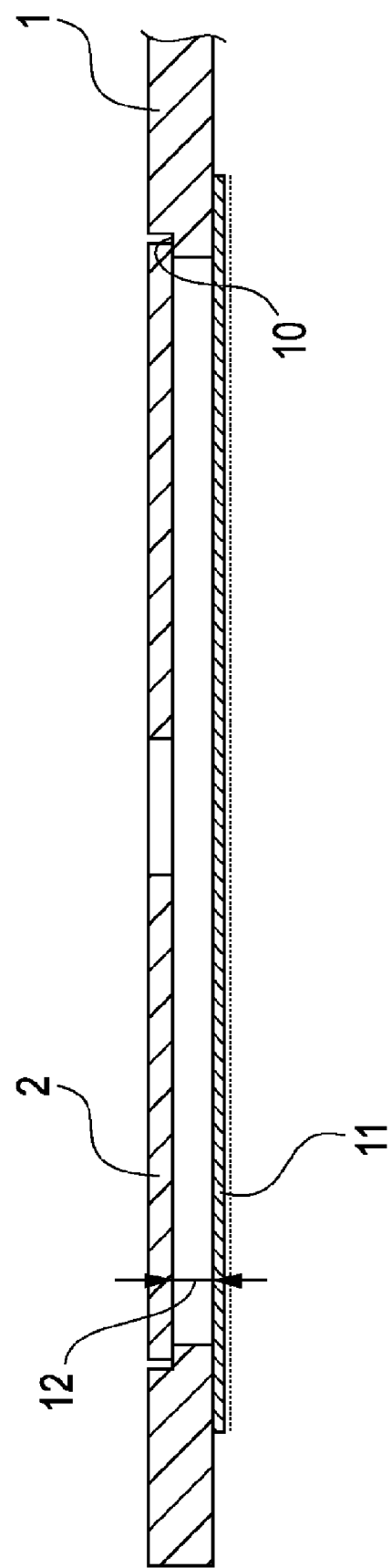
FIG. 6 is a cross-sectional view of a tray according to a variation of the embodiment.

A variation of the above exemplary embodiments will now be described. FIG. 6 is a cross-sectional view of a tray 1 holding a disc medium 2. In the case shown in FIGS. 4A to 4C, the tray 1 has the holding portion 3 that allows light to be transmitted and diffused therethrough. In this variation, a light-diffusing sheet 11 is employed in place of the holding portion 3. The light-diffusing sheet 11 is provided at a predetermined distance from the disc medium 2. The disc medium 2 is held by a stepped portion 10 provided in the tray 1. The disc medium 2 is enclosed and positioned by the stepped portion 10, with a very small area along the outer circumference on one side thereof being held by the stepped portion 10. In the case shown in FIGS. 4A to 4C, the disc medium 2 set on the tray 1 is positioned relative to the tray 1 by both the stepped portion 5 and the holding portion 3. In this variation, the disc medium 2 is positioned only by the stepped portion 10.

The light-diffusing sheet 11, which is a thin member that allows light to be transmitted and diffused therethrough, is bonded to the bottom surface of the tray 1. The interval 12 between the bottom surface of the disc medium 2 held by the stepped portion 10 and the light-diffusing sheet 11 is set to be a value (0.5 mm in this variation) determined within the above-mentioned numerical range. To read the label side, the tray 1 having the disc medium 2 is placed on the glass table 20 of the scanner device, with the light-diffusing sheet 11 face down.

The light-diffusing sheet 11 may not necessarily be bonded to the tray 1. The tray 1 and the light-diffusing sheet 11 may alternatively be provided separately. In the alternative case, when reading is performed by using the tray 1, the user first spreads the light-diffusing sheet 11 over the glass table 20, and subsequently places the tray 1 having the disc medium 2 onto the light-diffusing sheet 11.

As another alternative, reading may be performed without the tray 1. Specifically, a user may place the disc medium 2 onto the glass table 20 with the light-diffusing sheet 11 interposed therebetween. In this alternative case, the light-diffusing sheet 11 is provided with a uniform thickness. The thickness can be determined within the range from 0.1 mm to 3 mm, or more strictly, from 0.5 to 1.5 mm, for the reason described above.

Variation 2

In each of the foregoing cases, whether or not the document is a disc medium is automatically checked by the apparatus. Alternatively, the check may be performed in accordance with an instruction by a user. To read a document having a reflective diffraction surface, the user supplies an appropriate input to the apparatus by using buttons or the like. In accordance with the input, the apparatus places the light-diffusing plate 23 into the optical path of the illuminating light, as in FIG. 1A. In this state, reading is performed. In such a case, scanning, which is to be performed twice in the above cases, is performed only once. This contributes to quick reading. Even if a document to be read does not have a disk-like shape but has a reflective diffraction surface, reading with reduced nonuniformity is realized.

To summarize, in the case where the target surface of a medium contains a reflective diffraction surface, nonuniformity in the read image caused by interference due to diffracted light from the reflective diffraction surface can be assuredly suppressed. Moreover, image reading can be performed by an appropriate method depending on whether or not the target surface of the medium contains a reflective diffraction surface.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-201963 filed Aug. 5, 2008 and No. 2008-201964 filed Aug. 5, 2008, which are hereby incorporated by reference herein in their entirety.

What is claimed is:

1. An image reading apparatus configured to read reflected light from a document that is illuminated, the apparatus comprising:
    a light source configured to illuminate the document;
    an image pickup unit configured to read the reflected light from the document illuminated with light from the light source;
    a tray onto which an optical disc as the document is to be set, the tray having a disc-receiving surface serving as a diffusing member configured to diffuse light transmitted therethrough; and
    a selecting unit configured to select whether or not the diffusing member is to be placed between the light source and the document depending on whether or not the document has a reflective diffraction surface,
    wherein, in a case where a label is to be printed on the optical disc, the tray serves as a support member used when the optical disc is placed onto a printing device.

2. The apparatus according to claim 1, further comprising:
    a checking unit configured to check whether or not the document has a refractive diffraction surface; and
    a control unit configured to control the selecting unit in accordance with an output from the checking unit.

3. The apparatus according to claim 1, wherein the selecting unit selects that the diffusing member is to be placed between the document and the image pickup unit in a case where the document has the reflective diffraction surface, and selects that the diffusing member is not to be placed between the document and the image pickup unit in a case where the document does not have a reflective diffraction surface.

4. The apparatus according to claim 1,
    wherein the diffusing member has a light-diffusing surface, and
    wherein the document to be read is held at a distance of 0.1 mm to 3 mm from the light-diffusing surface.

5. The apparatus according to claim 4, wherein the light-diffusing surface is one of a prism sheet surface and a surface subjected to any of graining, surface roughing, matte coating, and application of light-diffusing resin.

6. The apparatus according to claim 1, wherein the diffusing member includes a transparent member and a light-diffusing substance mixed in the transparent member.

* * * * *